United States Patent
Lenosky (10) Patent No.: US 7,039,330 B2
(45) Date of Patent: May 2, 2006

(54) OPTICAL SIGNAL EQUALIZER WITH ADJUSTABLE LINEAR FILTER

(75) Inventor: Thomas Lenosky, Mountain View, CA (US)

(73) Assignee: Finisar Corporation, Sunnyvale, CA (US)

( * ) Notice: Subject to any disclaimer, the term of this patent is extended or adjusted under 35 U.S.C. 154(b) by 68 days.

(21) Appl. No.: 10/684,122

(22) Filed: Oct. 10, 2003

(65) Prior Publication Data

US 2005/0078779 A1   Apr. 14, 2005

(51) Int. Cl.
*H04B 10/06* (2006.01)
*H03H 7/30* (2006.01)
*H03K 5/159* (2006.01)

(52) U.S. Cl. ............... 398/208; 398/209; 375/233
(58) Field of Classification Search ............ 398/208, 398/159, 158, 233, 209
See application file for complete search history.

(56) References Cited

U.S. PATENT DOCUMENTS

| | | | |
|---|---|---|---|
| 6,252,913 B1* | 6/2001 | Kientz | 375/292 |
| 6,798,854 B1* | 9/2004 | Kolze et al. | 375/350 |
| 2003/0189997 A1* | 10/2003 | Shanbhag et al. | 375/348 |
| 2004/0114700 A1* | 6/2004 | Yu et al. | 375/371 |
| 2004/0136731 A1* | 7/2004 | Wang et al. | 398/208 |
| 2005/0018765 A1* | 1/2005 | Endres et al. | 375/233 |
| 2005/0053127 A1* | 3/2005 | Shiue et al. | 375/232 |

* cited by examiner

*Primary Examiner*—M. R. Sedighian
*Assistant Examiner*—Shi K. Li
(74) *Attorney, Agent, or Firm*—Workman Nydegger (57) ABSTRACT

Mitigating errors caused by the dispersion of optical or electrical signals. Errors caused by dispersion in high frequency system are mitigated by passing a received signal through an adjustable linear filter that counteracts a channel response of a channel on which the received signal has traveled to produce an electrical signal. The adjustable linear filter has a number of coefficients. A figure of merit is calculated for the electrical signal, where the figure of merit includes the second and fourth moments of the electrical signal. The coefficients of the linear filter are adjusted based on the value of the figure of merit so as to minimize the figure of merit.

24 Claims, 6 Drawing Sheets

OPTICAL SIGNAL EQUALIZER WITH ADJUSTABLE LINEAR FILTER

BACKGROUND OF THE INVENTION

1. The Field of the Invention

The invention generally relates to the transmission of signals in communication systems. More specifically, the invention relates to systems and methods of mitigating the effects of dispersion in high frequency communication systems.

2. Description of the Related Art

In the field of data transmission, one method of efficiently transporting data is through the use of fiber-optics. Digital data is propagated through a fiber-optic cable using light emitting diodes or lasers. To send data on a fiber-optic cable, the data is typically converted from electronic data generated by computers to optical data that can be propagated onto the fiber-optic cable. This conversion is generally done using a laser or light emitting diode. When light is generated (or is at "high power") a logical "1" is presented. The absence of light (or light at "low power") represents a logical "0". Thus an optical signal with sharp rising transitions and falling transitions representing logical "1" and "0" bits is transmitted onto the fiber-optic cable.

Much of the fiber-optic cable presently installed is multi-mode meaning that signals travel through different paths along the fiber-optic cable. For example, portions of a signal may travel directly down the fiber-optic cable while other portions of the signal "bounce" or are reflected back and forth along the fiber-optic cable. Further, for portions of the signal that are reflected back and forth, each portion may take a different path resulting in different velocities at which the portions of the signal travel through the fiber-optic cable. Thus, a single signal may take several paths resulting in dispersion of the signal as it travels along the fiber-optic cable. The dispersion of signals is more pronounced as the distances that the signals travel is increased or as the frequency at which the signals are transmitted increases. As the signals disperse, portions of adjacent bits may disperse into each other. For example, portions of a "1" or high power bit may spread into the time of the signal previously occupied by a "0" or low power bit. Similarly, the absence of power in a "0" or low power bit may cause a decrease in the power of an adjacent "1" or high power bit at various times within the time of the signal previously occupied by a "1" bit. This phenomenon is commonly referred to as intersymbol interference. These effects are often illustrated and studied using an open eye diagram such as the diagram shown in FIG. 2. As dispersion takes place, the high and low thresholds are blurred. The more blurring that takes place between the thresholds, the more "closed" an eye on the open eye diagram is. The more closed an eye is, the more difficult it is to interpret data bits.

Because of the dispersion, some of the data bits embedded in the electronic signals may be erroneously interpreted. While it is expected that some erroneous interpretations of data bits may occur, most communication standards specify a maximum number of erroneous interpretations that may occur. This is usually specified as the maximum bit error rate (BER). For example, the maximum BER in 10 Gigabit Ethernet systems is $10^{-12}$. To the extent that dispersion causes more errors than this, the effects of the dispersion must be mitigated.

While dispersion can be mitigated by installing single mode fiber, this solution is expensive to implement. Replacing the large amounts of fiber-optic cable that may be installed in a given location may be expensive and time consuming.

Alternatively, several different wavelengths can be transmitted over a single fiber. Each wavelength carries a signal at a lower bit rate to reduce errors. As such, the overall bit rate of a signal can be maintained while minimizing errors. This solution however would require multiple lasers to generate the different wavelengths, multiple photodiodes to receive the different wavelengths, and expensive multiplexing equipment to combine and separate the different wavelengths.

Similar problems exist in electronic (such as copper or other conductor based) transmission lines. For example, a small 7–10 inch transmission line formed on a printed circuit board may cause sufficient dispersion in an electronic signal being propagated at 10 Gigabits per second to effectively render the electronic signal unreadable.

BRIEF SUMMARY OF THE INVENTION

One embodiment of the invention includes a method of mitigating the effects of dispersion in a high frequency communication channel. The method receives a signal. The signal is passed through an adjustable linear filter. The adjustable linear filter has a number of coefficients. The output of the adjustable linear filter is an electrical signal. A figure of merit is calculated that includes the second and fourth moments of the electrical signal. The coefficients of the adjustable linear filter are adjusted based on at least the value of the figure of merit.

In another embodiment of the invention, a signal conditioner for mitigating the effects of dispersion in high frequency communication circuits is disclosed. The signal conditioner includes an adjustable linear filter that has a number of adjustable coefficients. The adjustable linear filter is configured such that it receives a signal and produces an electrical signal based on the value of the adjustable coefficients. A circuit coupled to the adjustable linear filter is configured to calculate a figure of merit by calculating the second and fourth moments of the electrical signal. A microprocessor connected to the circuit and to the adjustable linear filter is configured to provide the adjustable coefficients based on the value of the figure of merit. Embodiments of the invention mitigate dispersion effects in high frequency communication systems by calculating a figure of merit that corresponds to signal quality and adjusting a linear filter to optimize the figure of merit.

These and other advantages and features of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Embodiments of the invention compensate for dispersion related effects caused by a communications channel. Embodiments pass a signal that has traveled on the channel through a linear filter. The linear filter is designed to counteract the dispersion related effects. These embodiments calculate a figure of merit for a signal that is output from the linear filter. The figure of merit may be a function of the second and fourth moments of the output. Based on the value of the figure of merit, coefficients of the linear filter can be adjusted so as to improve the performance of the linear filter.

Figure 1:
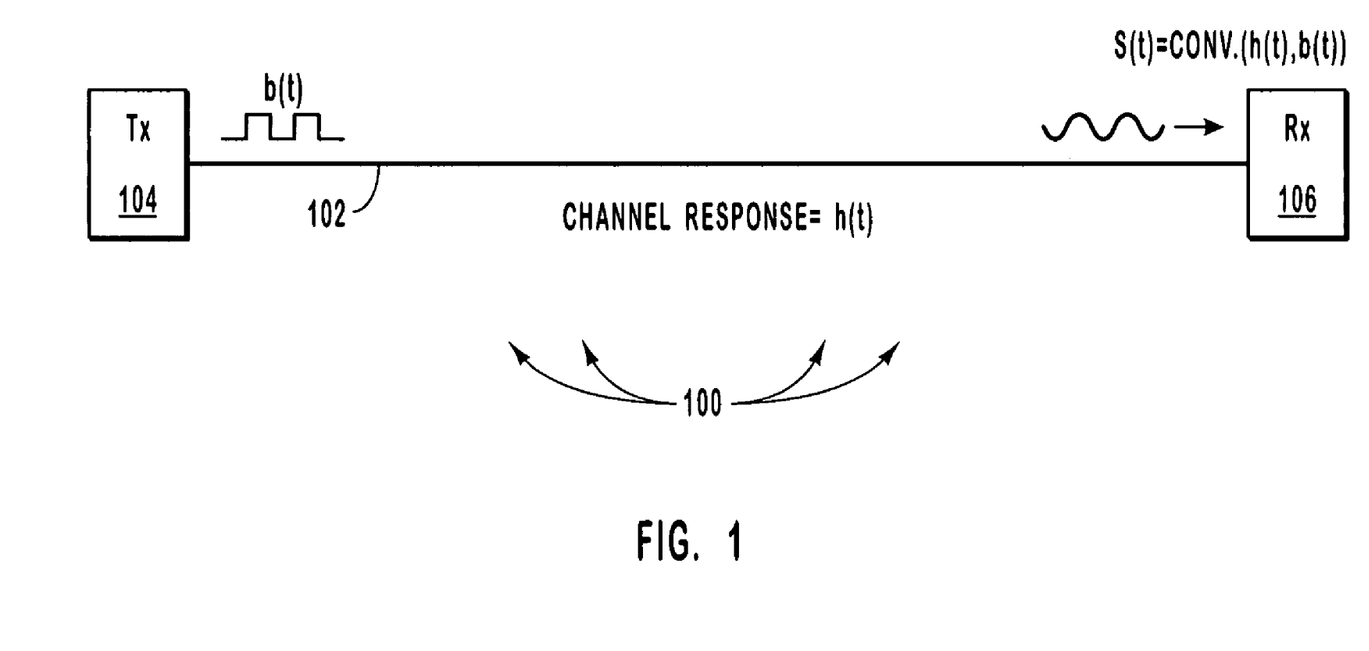
FIG. 1 illustrates a fiber optic communication path where embodiments of the present invention may be practiced.

An example of optical signal dispersion is shown in FIG. 1 which generally shows a fiber-optic communication path 100. A data signal b(t) is propagated onto a fiber-optic cable 102 by a transmitter 104. When the data signal b(t) is propagated onto the fiber-optic cable 102, the transitions between high and low logical bits are sharp. As the data signal b(t) travels along the fiber-optic cable 102 dispersion takes place such that a received signal s(t) received by a receiver 106 typically has significant dispersion and/or distortion resulting in more gradual transitions. As previously mentioned, intersymbol interference makes it difficult to recognize bits. This will be discussed herein with more detail as FIGS. 2 and 4, which show open eye diagrams, are discussed.

The received signal s(t) in the time domain is a convolution of the data signal b(t) and the channel response h(t) of the fiber-optic cable 102. In the frequency or Fourier domain, the received signal s(f) is simply a multiplication of the data signal b(f) and the channel response h(f). This may be represented by the equation:

$$s(f) = h(f) * b(f) \quad 1)$$

An equalizer implemented at the receiver may counteract the effect of the channel response h(f). For example, implementing a linear equalizer with a transfer function:

$$g(f) = \frac{1}{h(f)} \quad 2)$$

counteracts the effects of the channel response h(f) and recovers the original bits sent in the data signal b(t).

The channel response h(f) is a complex value with both amplitude and phase information. The transfer function can therefore be written as:

$$g(f) = \frac{1}{|h(f)| \times \chi(f)} \quad 3)$$

where $\chi(f)$ is the phase response of the channel response h(f). The amplitude of h(f) can be calculated by measuring the Fourier spectrum of s(f) and dividing the magnitude of s(f) by the magnitude of b(f). The Fourier spectrum of b(f) is known based on the assumption that the bits are random. Thus the magnitude of h(f) is given by the equation:

$$|h(f)| = \frac{|s(f)|}{|b(f)|}. \quad 4)$$

The phase cannot be as readily obtained.

In one embodiment of the invention the phase is determined by calculating a figure of merit F that measures the quality of a signal that has been equalized by the transfer function g(f). F may be designed in such a way that the optimal choice for $\chi(f)$ causes F to take on its minimum value. F may be calculated in one embodiment using analog circuitry. Further, F may be calculated using a time average of F that is realized through circuitry such as a capacitor-type integrator. F may then be converted to a digital signal using an analog to digital converter. By using the time average of F, a slower analog to digital converter may be used. For example, the bit rate of a signal may be 10 Gb/s. The analog to digital converter may run at 1 Mhz. The time constant for the integrator may be 1 microsecond.

The digitized value of F is then fed into a microcontroller. The microcontroller may run an optimization algorithm to determine what coefficients should be applied to the linear filter to minimize F. Thus F converges towards its minimum value as coefficients of the linear filter are adjusted by the microcontroller based on the value of F. Digital to analog converters on the microcontroller may be used to set the filter coefficients for a linear filter used to generate the equalizer transfer function g(f). In some embodiments of the invention, the microcontroller also includes a spectrum analyzer to measure |s(f)|. By using the spectrum of s(f), the minimum value of F may be converged on more quickly.

Figure 2:
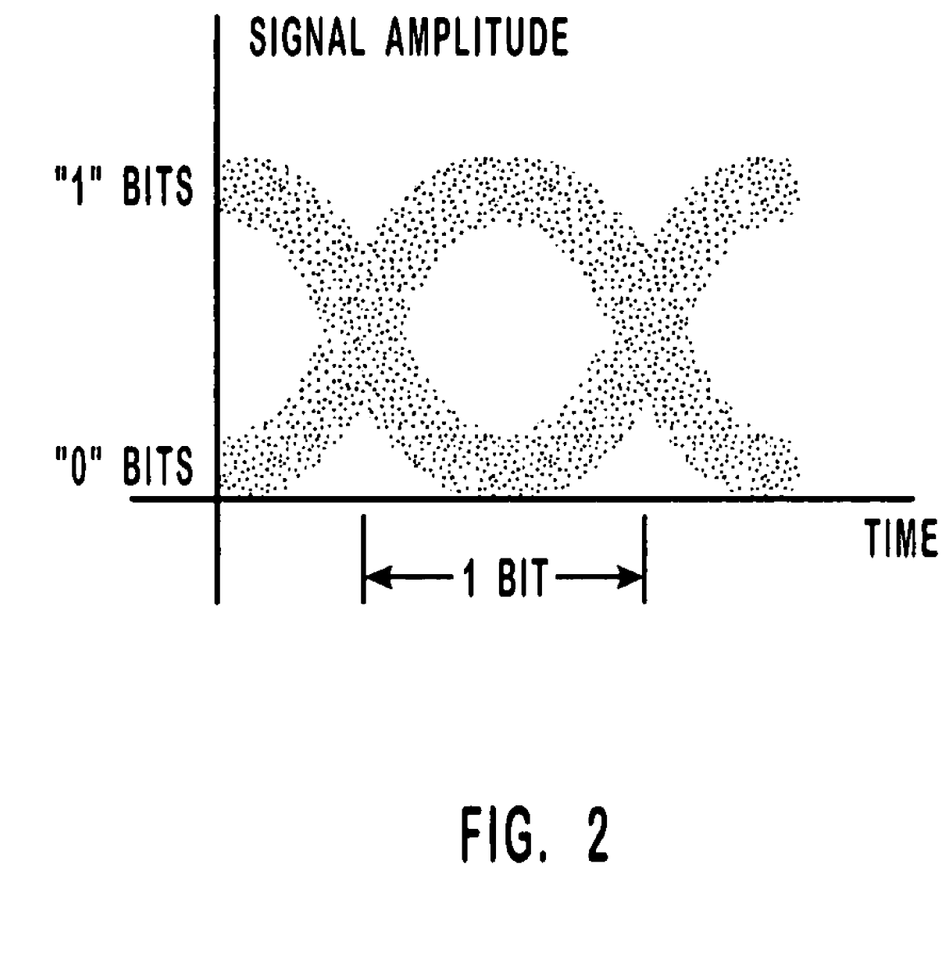
FIG. 2 illustrates an eye diagram indicating a measure of signal quality.

One figure of merit function F used in one embodiment of the invention is discussed with regards to an open eye diagram such as that shown in FIG. 2. The open eye diagram is a graphical representation of signal quality. The more open the eye, i.e. the further the "1" bit threshold is from the "0" bit threshold, the better the signal quality. In fact, BER can be calculated based on the open eye diagram. One figure of merit function F uses the second and fourth moment functions $M_2$ and $M_4$ of the equalized electrical signal amplitude relative to the center of the eye. The electrical signal amplitude is referred to hereinafter as A(t). The electrical signal amplitude A(t) is a differential such that a logical "1" is represented by a positive A(t) and a logical "0" is represented by a negative A(t). $M_2$ is the time average of $A^2(t)$. $M_4$ is the time average of $A^4(t)$. When:

$$F = \frac{M_4}{(M_2)^2}, \quad 5)$$

the minimum value of the figure of merit, F=1 occurs only when there is a perfectly open eye diagram.

Figure 3:
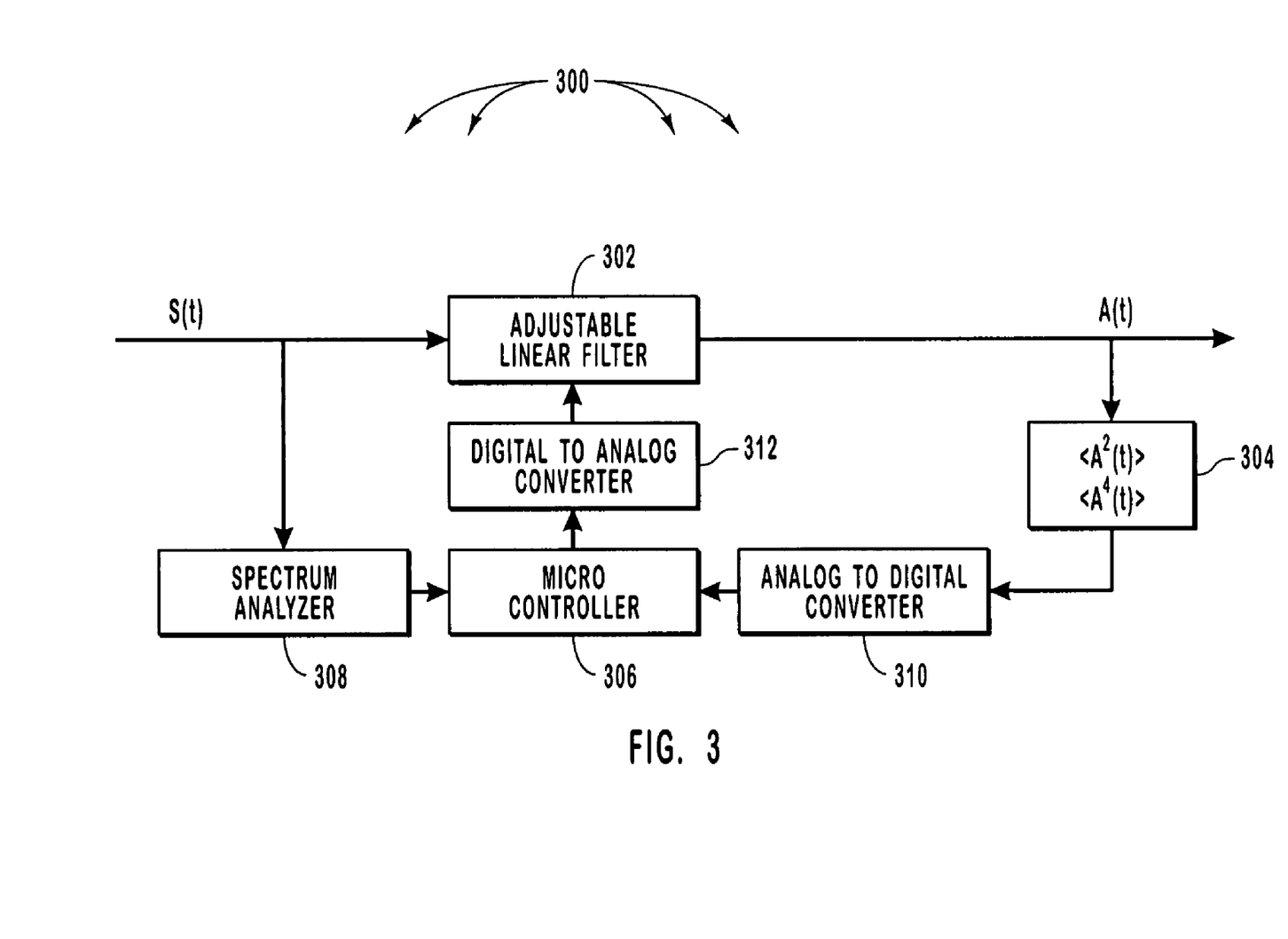
FIG. 3 illustrates a signal conditioner useful for practicing certain aspects of the present invention.

Referring now to FIG. 3, a block diagram showing the use of the figure of merit function F in a signal conditioner 300 is shown. FIG. 3 shows a received signal s(t) that is passed through an adjustable linear filter 302. The output of the adjustable linear filter 302 is the electrical signal amplitude A(t). A figure of merit function is calculated by analog circuitry 304. The figure of merit function is digitized using an analog to digital converter 310 and passed to a microcontroller 306. The microcontroller 306, using one or more digital to analog converters 312, adjusts the coefficients of the adjustable linear filter 302. For example, a standard optimization routine may be used to minimize a function R(y1, y2, y3, . . . , yn) where y1, y2, y3, . . . , yn are the coefficients of the adjustable linear filter and the optimization is over an n-dimensional coefficient space. FIG. 3 also illustrates a spectrum analyzer 308 to measure the spectrum of the received signal s(t). The spectrum analyzer 308 may output the results of the analysis of the spectrum of the received signal s(t) to the microcontroller 306.

In some embodiments of the invention these results may be used by the microcontroller 306 to control the adjustable linear filter 302. However, empirical testing has shown that embodiments of the invention do not require the spectrum analyzer 308 and that acceptable results can be achieved without using the spectrum analyzer 308. Using the spectrum analyzer 308 provides more information such that the microcontroller 306 can more precisely adjust the coefficients of the linear filter. For example, by using the spectrum analyzer, the microcontroller may be able to cause the figure of merit to converge to its minimum value more quickly.

Figure 4:
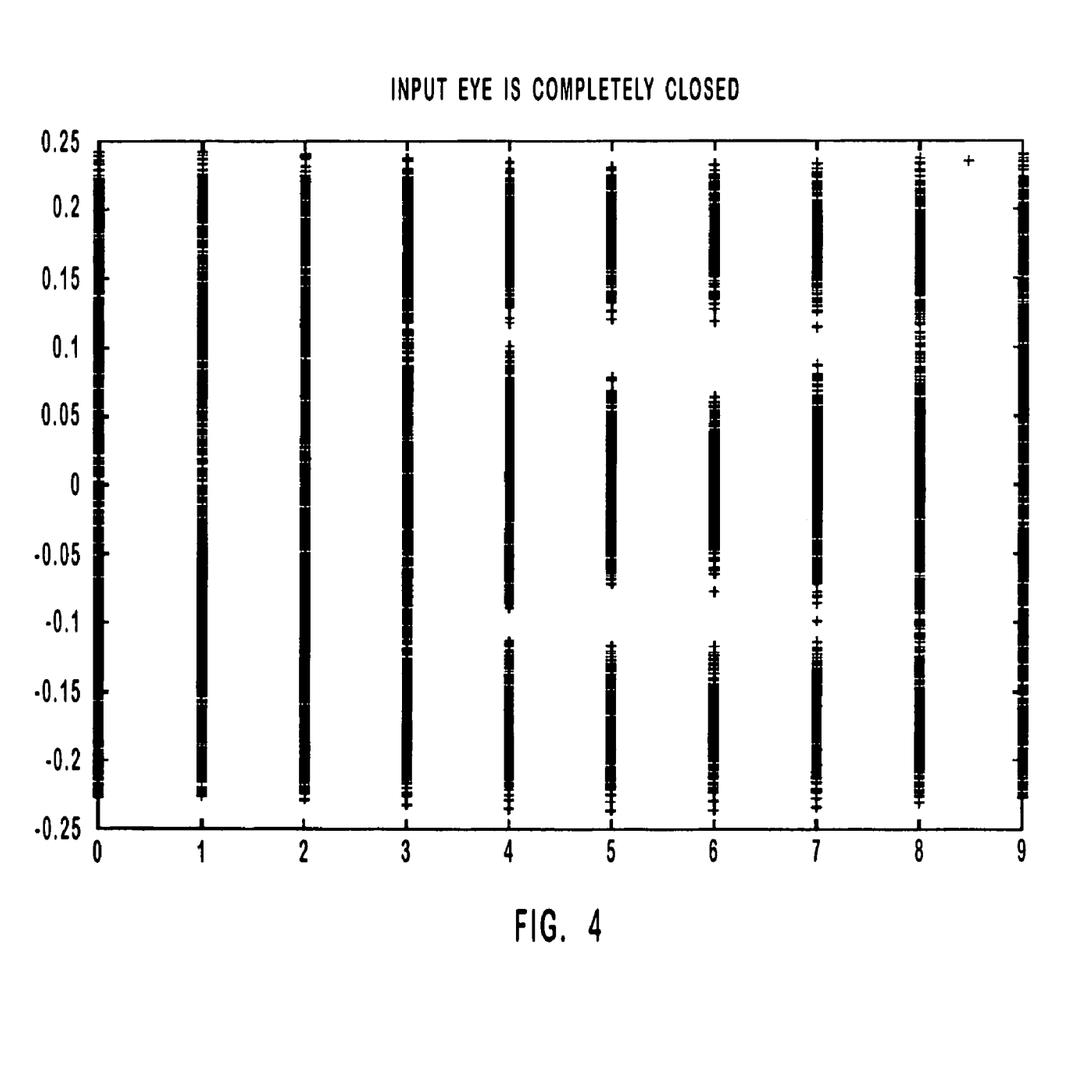
FIG. 4 illustrates an input eye diagram for an input signal used in empirical testing of one embodiment of the invention
Figure 5:
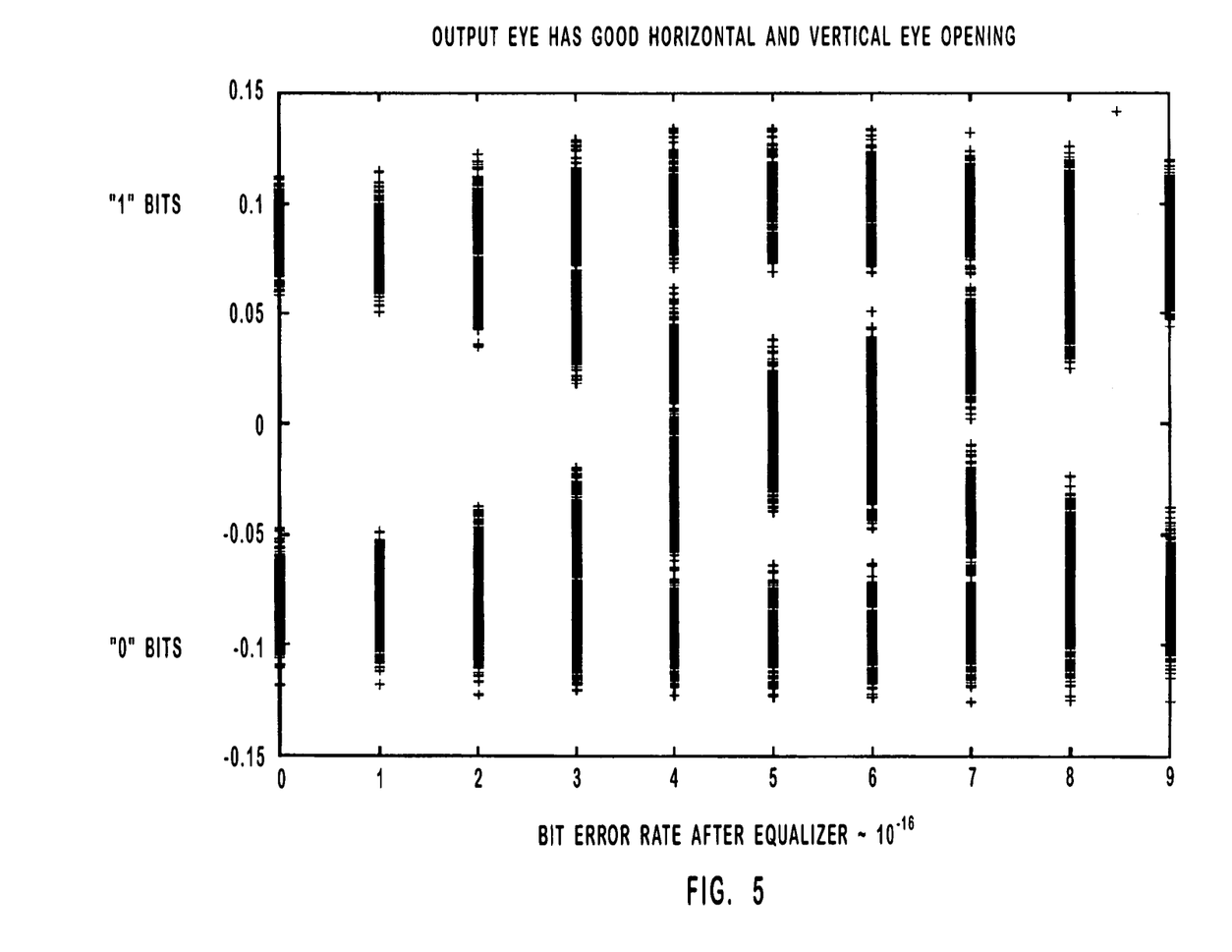
FIG. 5 illustrates the signal of FIG. 4 after it has been equalized with one embodiment of an adjustable linear filter.

Turning attention now to FIGS. 4 and 5, test results are demonstrated showing the effectiveness of one embodiment of the invention. In the illustrated test, 300 meters of multi-mode fiber were used as the fiber-optic cable 102. The input signal b(t) was a 10 gigabit per second signal. Data was recorded using an Agilent real-time oscilloscope with a 6 gigahertz bandwidth and two samples per bit. In the test, an algorithm was applied to the data after cubic spline interpellation to generate ten samples per bit. The figure of merit function F was implemented with a 60 tap transversal filter, i.e. 60 coefficients to the linear filter function, and fractional spacing equal to ½ bit. In some embodiments of the invention, fewer adjustable taps, such as 10 to 15, may be used.

FIG. 4 shows the received signal s(t), and demonstrates an input eye that is completely closed. After passing the received signal s(t) through an adjustable linear filter 302, a signal amplitude A(t) such as that shown in FIG. 5 was achieved. The BER achieved after passing the received signal s(t) through the adjustable linear filter 302 was $10^{-16}$. The BER generally specified for use with 10 gigabit per second systems is $10^{-12}$. Thus the empirical data demonstrates that embodiments of the present invention effectively open the eye in optical data transmission configurations.

Figure 6:
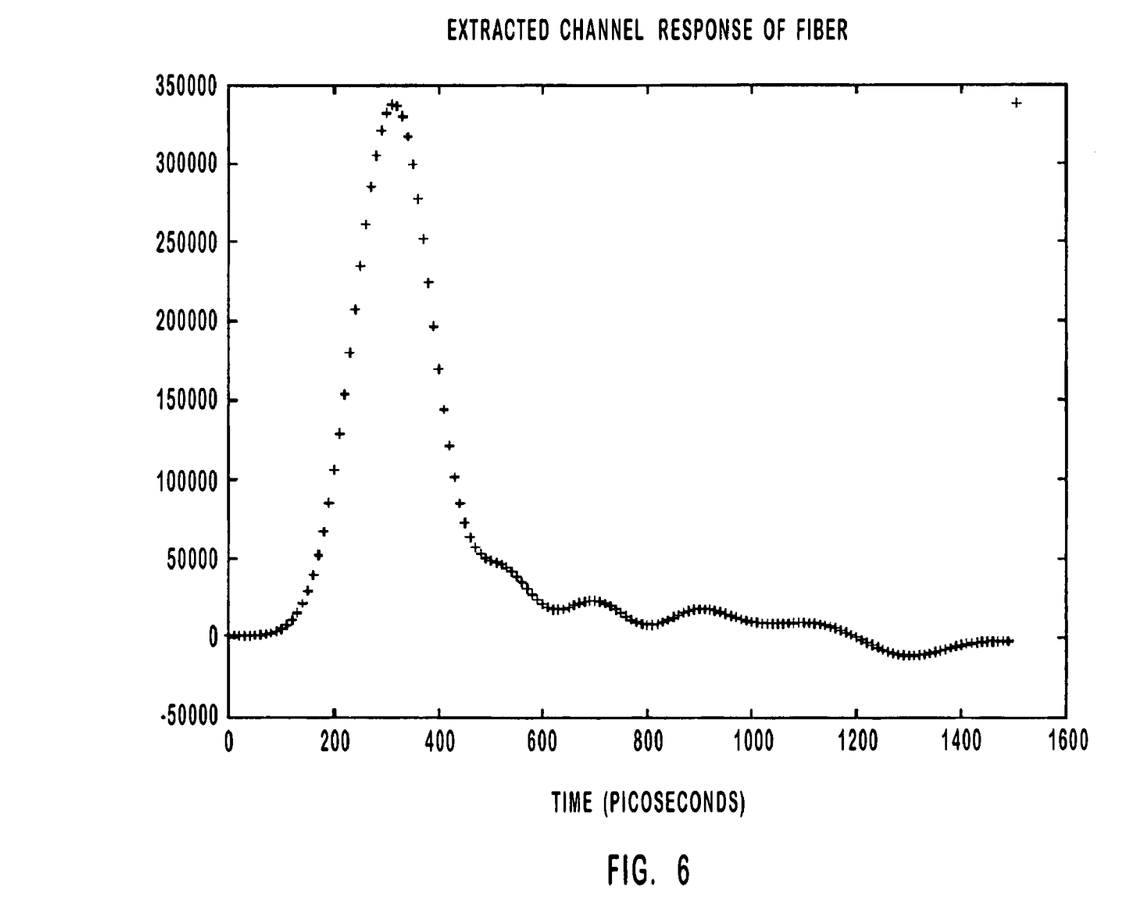
FIG. 6 illustrates a channel response of a fiber optic cable that was extracted by using certain aspects of the present invention.

Further, once the eye has been opened, by examining the χ(t) function that was used to generate the minimal figure of merit function F, the channel response of the fiber-optic cable h(t) can be extracted such as is shown in FIG. 6. Once the channel response of a particular channel has been extracted, some components of the signal conditioner 300 can be removed. As long as the channel response of the particular channel does not change, a linear filter with the appropriate coefficient set can effectively compensate for the channel response. Alternatively, a digital signal processor can take the place of the linear filter by canceling the effect of the channel response by dividing the received signal s(f) by the channel response h(f) to obtain the data signal b(f).

In fiber-optic communication environments, the invention may be implemented in numerous locations including as a portion of a post amplifier or as a portion of a clock data recovery circuit. The invention may also be implemented as a discrete tuning tool to discover the channel response of a particular channel. The discrete tuning tool may then be removed and an appropriate compensator placed in the channel.

While the above examples have been framed in the context of multi-mode fiber dispersion, the systems and methods described above may be useful in other applications such as chromatic dispersion compensation, polarization mode dispersion compensation, or applications requiring equalization of high-speed electrical signals. Specifically, the systems and methods described above may be used when high frequency electrical signals are input into any device, such as a printed circuit board transmission line or any other electrical path. Excessive dispersion may be equalized after traveling through the device by using the methods and systems described above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method of mitigating dispersion effects in a high frequency communications channel, the method comprising:
    passing a signal through an adjustable linear filter, the adjustable linear filter having a plurality of coefficients, the output of the adjustable linear filter being an electrical signal;
    calculating a figure of merit that represents a quality of the electrical signal; and
    adjusting the coefficients of the adjustable linear filter based at least on the value of the figure of merit so as to minimize the figure of merit and improve the quality of the electrical signal;
    wherein the figure of merit is determined from the equation:

$$F = \frac{M_4}{(M_2)^2}$$

wherein F is the value of the figure of merit; A(t) is the amplitude of the electrical signal; $M_4$ is the fourth moment of the electrical signal and equals the time average of $A^4(t)$, and $M_2$ is the second moment of the electrical signal and equals the time average of $A^2(t)$.

2. The method of claim 1 wherein the dispersion effects may be represented as a channel response, the method further comprising calculating a channel response from the figure of merit and the coefficients of the linear filter.

3. The method of claim 1 further comprising:
    measuring a magnitude of a spectrum of the signal;
    adjusting the coefficients of the linear filter based on at least the magnitude of the spectrum of the signal.

4. The method of claim 1 wherein calculating the figure of merit includes using a time average of the figure of merit.

5. A signal conditioner for use in mitigating the effects of dispersion in a signal, the signal conditioner comprising:
- an adjustable linear filter including a plurality of adjustable coefficients, the adjustable linear filter configured to receive a signal and to produce an output signal based on the adjustable coefficients of the linear filter;
- a circuit coupled to the adjustable linear filter configured to calculate a figure of merit by calculating a second and a fourth moment of the output signal; and
- a microcontroller coupled to the circuit and to the adjustable linear filter, the microcontroller configured to provide the adjustable coefficients based on a value of the figure of merit;
- wherein the figure of merit is determined from the equation:

$$F = \frac{M_4}{(M_2)^2}$$

wherein F is the value of the figure of merit; A(t) is the amplitude of the output signal; $M_4$ is the fourth moment of the output signal and equals the time average of $A^4(t)$, and $M_2$ is the second moment of the output signal and equals the time average of $A^2(t)$.

6. The signal conditioner of claim 5, the circuit being an analog circuit, the signal conditioner further comprising an analog to digital converter coupled between the microcontroller and the circuit, the analog to digital converter configured to digitize the figure of merit.

7. The signal conditioner of claim 5, further comprising a digital to analog converter coupled between the microcontroller and the adjustable linear filter, the digital to analog converter configured to convert signals from the microcontroller into the adjustable coefficients usable by the adjustable linear filter.

8. The signal conditioner of claim 5, wherein the circuit comprises an integrator configured to produce a time average value of the figure of merit.

9. The signal conditioner of claim 8, wherein the integrator is an analog capacitor type integrator.

10. The signal conditioner of claim 5, further comprising a spectrum analyzer configured to measure the spectrum of the received signal, the microcontroller configured to use the measured spectrum when providing adjustable coefficients.

11. The signal conditioner of claim 5, wherein the signal conditioner is adapted for use in mitigating dispersion effects in multi-mode fiber optic cables.

12. The signal conditioner of claim 5, wherein the signal conditioner is adapted for use in mitigating chromatic dispersion.

13. The signal conditioner of claim 5, wherein the signal conditioner is adapted for use in mitigating polarization mode dispersion.

14. The signal conditioner of claim 5, wherein the signal conditioner is adapted for use in mitigating dispersion in high-speed electrical transmission lines.

15. The signal conditioner of claim 5, wherein the signal conditioner is adapted for use in interpreting signals caused by chromatic dispersion.

16. A signal conditioner for use in interpreting a signal that has experienced dispersion caused at least by intersymbol interference, the signal conditioner comprising:
- an adjustable linear filter that receives an input signal, wherein linear coefficients of the adjustable linear filter alter the input signal to remove at least a portion of dispersion in the input signal;
- a circuit that determines a figure of merit from an output signal of the adjustable linear filter, wherein the figure of merit is related to at least a phase component of the output signal; and
- a microcontroller that uses the figure of merit determined by the circuit to adjust the linear coefficients of the adjustable linear filter such that a quality of the output signal improves;
- wherein the figure of merit is determined from the equation:

$$F = \frac{M_4}{(M_2)^2}$$

wherein F is the figure of merit; A(t) is the amplitude of the output signal; $M_4$ is the fourth moment of the output signal and equals the time average of $A^4(t)$, and $M_2$ is the second moment of the output signal and equals the time average of $A^2(t)$.

17. The signal conditioner of claim 16, the circuit being an analog circuit, the signal conditioner further comprising an analog to digital converter coupled between the microcontroller and the circuit, the analog to digital converter configured to digitize the figure of merit.

18. The signal conditioner of claim 16, further comprising a digital to analog converter coupled between the microcontroller and the adjustable linear filter, the digital to analog converter configured to convert signals from the microcontroller into the linear coefficients usable by the adjustable linear filter.

19. The signal conditioner of claim 16, wherein the circuit comprises an integrator configured to produce a time average value of the figure of merit.

20. The signal conditioner of claim 19, wherein the integrator is an analog capacitor type integrator.

21. The signal conditioner of claim 16, further comprising a spectrum analyzer configured to measure the spectrum of the signal, the microcontroller configured to use the measured spectrum when providing adjustable coefficients.

22. The signal conditioner of claim 16, wherein the signal conditioner is adapted for use in interpreting signals caused by multi-mode fiber optic cables.

23. The signal conditioner of claim 16, wherein the signal conditioner is adapted for use in interpreting signals caused by polarization mode dispersion.

24. The signal conditioner of claim 16, wherein the signal conditioner is adapted for use in interpreting signals caused by high-speed electrical transmission lines.

* * * * *